United States Patent

Braun

[15] 3,644,683

[45] Feb. 22, 1972

[54] PROCESS AND APPARATUS FOR MARKING AND EDITING OF ELONGATED RECORD CARRIERS

[72] Inventor: Edward H. Braun, 6603 Old Stage Road, Rockville, Md. 20852

[22] Filed: May 7, 1969

[21] Appl. No.: 822,487

[52] U.S. Cl. ........179/100.2 B, 179/100.2 S, 179/100.2 MP, 352/13, 352/17

[51] Int. Cl. ....................................G11b 23/42, G11b 31/00

[58] Field of Search ................179/100.2 B, 100.2 S; 352/13, 352/17, 25, 24

[56] References Cited

UNITED STATES PATENTS

| | | | |
|---|---|---|---|
| 2,677,728 | 5/1954 | Kolb et al. | 179/100.2 |
| 2,932,235 | 4/1960 | Ochiai | 179/100.2 |
| 2,975,672 | 3/1961 | Shields | 179/100.2 |
| 3,030,441 | 4/1962 | Nemeth | 179/100.2 |
| 3,176,067 | 3/1965 | MacHein | 179/100.2 |
| 2,961,919 | 11/1960 | DeAngelo | 179/100.2 MP |
| 3,492,068 | 1/1970 | Baron | 179/100.2 S |

*Primary Examiner*—Bernard Konick
*Assistant Examiner*—Jay P. Lucas
*Attorney*—Cushman, Darby & Cushman

[57] ABSTRACT

A method and apparatus for marking a first elongated record carrier to facilitate its editing in conjunction with the editing of a second record carrier, the two record carriers bearing information that is to be synchronously reproduced. The first record carrier has both a program signal and a control signal recorded thereon. The control signal is conventionally used to control the rate of information reproduction from the second carrier during playback. The first record carrier is physically marked in a humanly sensible form at precise intervals of length bearing a predetermined relationship to the control signals recorded thereon thus correlating predetermined marked lengths of the first record carrier with predetermined lengths of the second record carrier to facilitate editing of both without the possible serious loss of synchronization that could otherwise easily occur due to cumulative phase shift errors, etc. caused by indiscriminate splicing of the control signal.

12 Claims, 11 Drawing Figures

INVENTOR
EDWARD H. BRAUN

BY Cushman, Darby & Cushman
ATTORNEYS

INVENTOR
EDWARD H. BRAUN
BY Cushman, Darby & Cushman
ATTORNEYS

INVENTOR
EDWARD H. BRAUN

BY
Cushman, Darby & Cushman
ATTORNEYS

INVENTOR
EDWARD H. BRAUN

BY
Cushman, Darby & Cushman
ATTORNEYS

INVENTOR
EDWARD H. BRAUN
BY
Cushman, Darby & Cushman
ATTORNEYS

PROCESS AND APPARATUS FOR MAKING AND EDITING OF ELONGATED RECORD CARRIERS

This invention relates generally to recordings made on elongated flexible material, such as magnetic tape, and more particularly to the precision editing of sound, picture, or other records made on elongated flexible material.

One principal application of the invention is in the editing of sound records to establish or maintain synchronism with concomitant pictures on motion picture film, magnetic tape, slides, or other type of picture record.

Another application is in the production of recordings, which must in their entirety, or portions thereof, run for certain precise time intervals. Such recordings are useful, for example, in the field of radio or television broadcasting, although by no means restricted thereto.

Another application of the invention is in the precision time control of electrical or other apparatus by means of recordings on elongated flexible materials.

Other applications will become apparent as the description of the invention proceeds.

Since the advent of magnetic tape recording, many efforts have been made to utilize the advantages thereof in the synchronous recording of sound with motion pictures. The main advantages of recording on magnetic material over recording on film by the conventional optical methods are (1) immediate playback is possible so that the quality of the sound may be determined instantly and a retake made if necessary; (2) the quality obtainable on magnetic recordings, as to dynamic range, frequency response, distortion characteristics, etc., is far superior to optical methods.

There are two general classifications of magnetic recording material available for synchronous recording with motion pictures, the so-called "sprocketed magnetic film" and the "-sprocketless magnetic tape."

The "sprocketed magnetic film" comprises a flexible base (similar to that used for the concomitant picture record) which is perforated at regular intervals with so-called "-sprocket holes," and upon which is coated or in which is impregnated a magnetic material. This film is driven by a synchronous or self-synchronous motor through sprockets which engage the perforations of the film in the same manner employed in the case of the picture record, or in the case of ordinary optical sound recording. Thus, synchronous speed of the sound and picture recording materials is insured during recording or playback. The precise process by which the sound is recorded on or played back from the magnetic material is not important for the present purposes, and any of the methods known to the art may be employed.

The "sprocketless magnetic tape" has, as its name implies, no sprocket holes which can be engaged, and is usually driven between two rotating cylinders which are held together under pressure. However, even if these cylinders are driven at synchronous speed this will not by any means insure that the elongated recording medium is also driven at synchronous speed. Firstly, there is some slippage at the point of contact between the drive cylinders and the recording medium, and secondly, the recording medium tends to contract or expand due to changes in temperature, humidity, age, varying tension during recording or playback, etc. When one considers that these effects may amount to the equivalent of several percent of the total length of the tape, one can see that after a running time of 30 minutes, for example, the synchronism may be off by fifteen or twenty seconds or more. When one further considers that an objectionable situation arises when the sound and picture are out of synchronism by more than a small fraction of a second (say one-sixteenth), one can see that some other arrangement must be used to insure that sound and picture remain in step.

A number of methods have been suggested for doing this. In professional work, while the picture is being taken, the camera is driven synchronously with the power line voltage, while the tape recorder need not be driven synchronously. A sample of the power line voltage is recorded on the tape (hereinafter called the "control track") along with the program material, but in such a way as to be separable therefrom. This separation may be achieved by recording the control track in such a manner that its magnetization vector is at right angles to that of the program material, or the power line frequency may be used to modulate a high frequency (say 15 kHz.) signal which is then recorded with the same direction of magnetization as the program material, and later separated therefrom by appropriate filters. Another method, which is probably the cheapest and requires the least attention and adjustment, is to simply use a multiple track recorder and record the program material on one track and the control signal on another track. In amateur work, the camera may be spring or battery driven, and the control signal is derived from a device attached to the camera whose output frequency is proportional to camera speed. This device might be a small alternator or AC tachometer, or it might be a commutator which interrupts a DC voltage to provide the required control signal. The control signal may then be recorded by means of one of the methods referred to above. However, the exact method by which the control signal is recorded and reproduced is not important for the present discussion.

After the picture and sound records have been made together, several possibilities exist. It may be desired to show the picture, accompanied directly by sound from the original tape. In this case, the control track on the tape is used to control the speed of a synchronous motor on the projector. This may be accomplished by direct amplification of the control track, or by using the control track to synchronize an inverter, or by other methods. In any case, it can easily be seen that the relative speed of the sound and picture records will be exactly the same during playback as they were during recording, regardless of tape slippage or change in dimension, and regardless of the exact speed of the tape recorder or playback machine.

Or, it may be desired to transfer the recordings from the tape to an optical or magnetic sound track on film containing sprocket holes. The control track is again used to govern the speed of the synchronous motor on the film recorder, and perfect synchronization between picture and sound is again achieved, independently of the deleterious effects of tape slippage, stretch, shrinkage, etc., previously mentioned.

One might be inclined to decide in favor of using magnetic film having sprocket holes, thus avoiding the synchronizing problems just described. However, the sprocketless tape has several major advantages over the perforated type of film. First of all, it is considerably cheaper, costing only about one-tenth the price of the perforated, magnetically coated film. This rapidly results in tremendous savings on recording stock. Second of all, the problem of sprocket flutter and other difficulties encountered in achieving a smooth drive with the perforated-type film cause the price of film-type recorders to be several times that of recorders using sprocketless magnetic tape. Thus, for compelling economic reasons, it is highly desirable to use the sprocketless type recording.

However, a very serious problem immediately arises when an attempt is made to exploit the advantages of the sprocketless tape. In ordinary motion picture work, the whole film does not consist of one long continuous scene which is made by allowing the camera to run continuously while the action proceeds from beginning to end. On the contrary, it is necessary and desirable to stop the camera and sound recorder at frequent intervals in order to change the angle from which the scene is viewed, or to change locale, or to insert titles or closeups, etc.

In the case where both the picture and sound are being recorded on film containing sprocket holes, this stopping and starting of the camera presents no problem. A clapstick or other synchronizing signal is supplied at the beginning of each scene on both the picture end and sound records. The film editor then cuts both films at this synchronizing point, and counts off equal numbers of frames of film on both picture and sound records. Thus, two lengths of film are obtained which both run precisely the same length of time when they are driven by synchronous or self-synchronous drive mechanisms supplied with the usual driving sprockets. Any number of such scenes may be spliced together end for end, and (assuming picture and sound in the first scene are started out together) it can easily be seen that picture and sound will always remain exactly in step, irrespective of the total length of the film or the number of scenes contained therein.

If it is desired to place picture and sound on the same film, this may easily be done at this point, since both picture and sound records comprise exactly the same number of frames of film.

However, when either the picture or the sound record or both are made on an elongated recording medium which contains no sprocket holes, the serious problem alluded to above arises. For purposes of discussion let us assume that the picture is recorder on sprocket film, while the sound record is recorded on sprocketless magnetic tape. The usual synchronizing signal, e.g., a clapstick, has been supplied at the beginning of both picture and sound records. The picture record is cut at the synchronizing point, and a certain number of frames counted off, as described previously.

The editor is now faced with the problem of cutting the sprocketless magnetic tape so that it will run *precisely* the same length of time as the concomitant picture. The word *precisely* is emphasized, because it can be appreciated that any discrepancy in length between picture and sound records is cumulative. That is to say, an error of even one-tenth of a second in each scene could become an error of one second after 10 scenes. It would not be possible to hold the error per scene much below this figure of one-tenth of a second, if even this could be achieved, since the effects of tape stretch and shrinkage previously mentioned would alone account for this error in the average length scene. And, perhaps most important of all as far as practical application of such a method is concerned, it would be extremely tedious and time consuming to have to measure 20 or 30 feet of flexible tape to an accuracy of a small fraction of an inch for every scene being edited. Furthermore, it may also be seen that whenever two lengths of sprocketless recording medium (corresponding to two successive scenes on the concomitant film) are spliced together, it is essential that it be done in such a manner that the phase of the synchronizing signal is continuous across the splice. Otherwise the equipment operated by the control track on playback would drop out of synchronization each time a splice passes the transducing head.

The apparent hopelessness of this editing problem has, up to the present time, seriously restricted use of sprocketless magnetic tape in motion picture work. Those who do use it must transfer the recordings to film for editing. But in so doing, practically every advantage of sprocketless tape is lost. Thus, the advantage of low cost is lost, since an equivalent length of sprocket film must be used. In addition, a second recorder for use with sprocket film must be purchased, or else the recording from tape to film must be done by an independent film laboratory, both alternatives involving large initial or continued expenditures. Furthermore, if the re-recording is done by optical methods, as is frequently the case, the great advantage of high-fidelity sound recording afforded by magnetic methods is lost.

Thus, the only remaining advantage of synchronous recording on sprocketless tape is the feature of immediate playback to determine the quality of the sound directly after recording it. All the other advantages discussed previously are lost when the recording must be transferred to sprocket film for editing.

For the amateur, such re-recording is out of the question because of its cost. At present, therefore, amateurs using sound-on-tape systems are unable to edit their films at all.

The present application discloses a process and apparatus which makes it possible to edit the original sprocketless tape (or a copy thereof) so that perfect synchronism between sound and concomitant picture may be established and maintained, irrespective of the total lengths of film and tape involved or the number of splices contained therein, thus retaining all of the advantages of sprocketless magnetic recording. The term "elongated record carrier" as used in this application refers to an elongated recording medium on which recordings may be made, but does not necessarily imply that the medium is already carrying a record, i.e., it does not necessarily imply that a recorded signal is already present on the medium, although this may sometimes be the case.

Further objects and advantages of the invention will become apparent by reference to the following description taken in conjunction with the accompanying drawings in which.

Figure 5A:
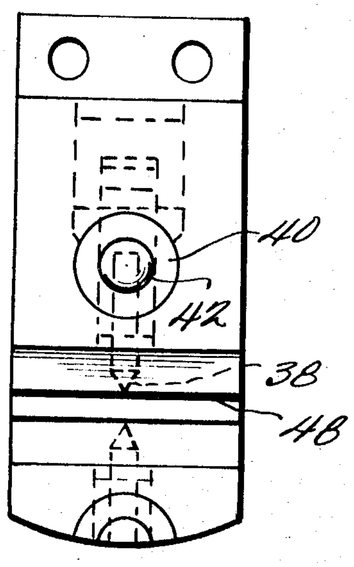
Figure 5B:
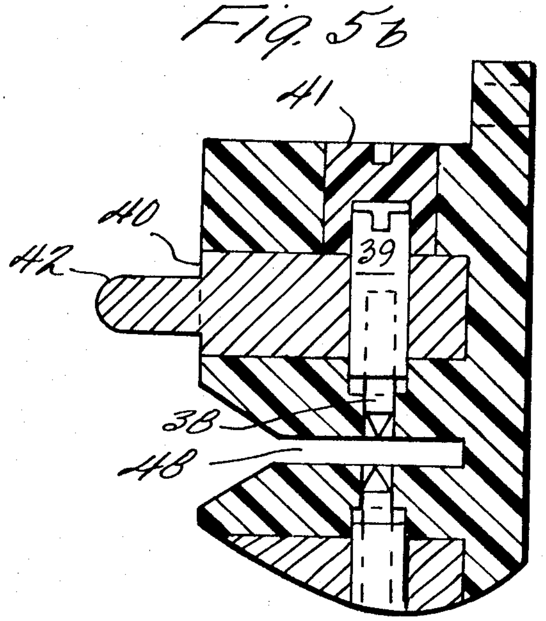

FIG. 5*a* is a front view of an electrode assembly used in applying markings to an elongated record carrier by means of an electric spark;

FIG. 5*b* is a cross section of the electrode assembly shown in FIG. 5*a;*

Figure 6A:
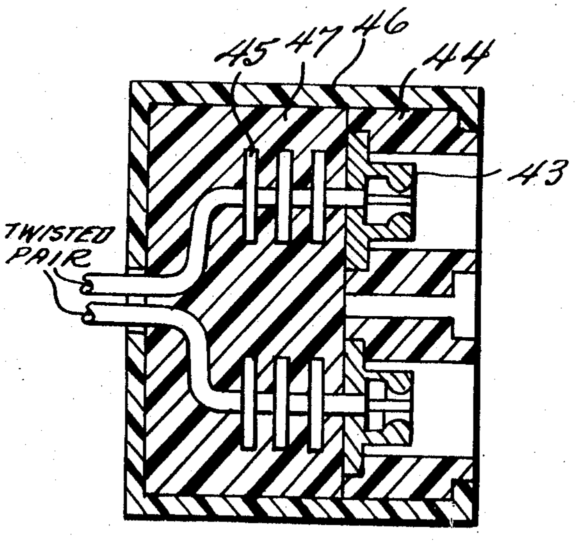

FIG. 6*a* is a cross section view of a plug used with the electrode assembly illustrated in FIG. 5*a;*

Figure 6B:
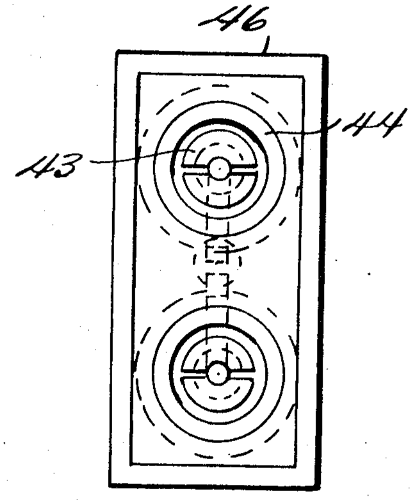

FIG. 6*b* is a front view of the plug shown in FIG. 6*a;*

Figure 7:
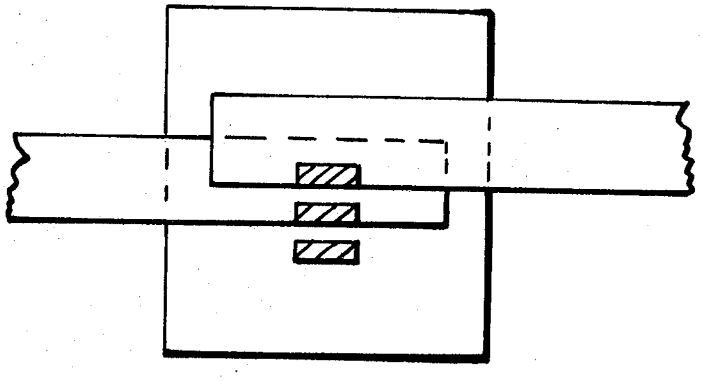
Figure 8:
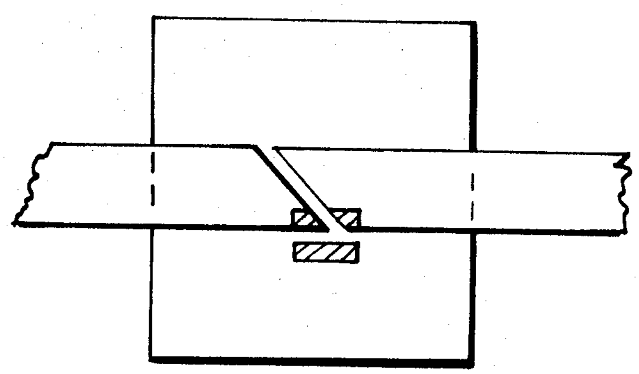

FIG. 7 is a diagrammatic view illustrating an apparatus and method of splicing two ends of a carrier having markings in accordance with the invention, the carrier being shown before the splicing is completed;

FIG. 8 is a diagrammatic view of the splicing apparatus and method of FIG. 7 after the two ends of the carrier have been cut by the splicing device.

Figure 9:
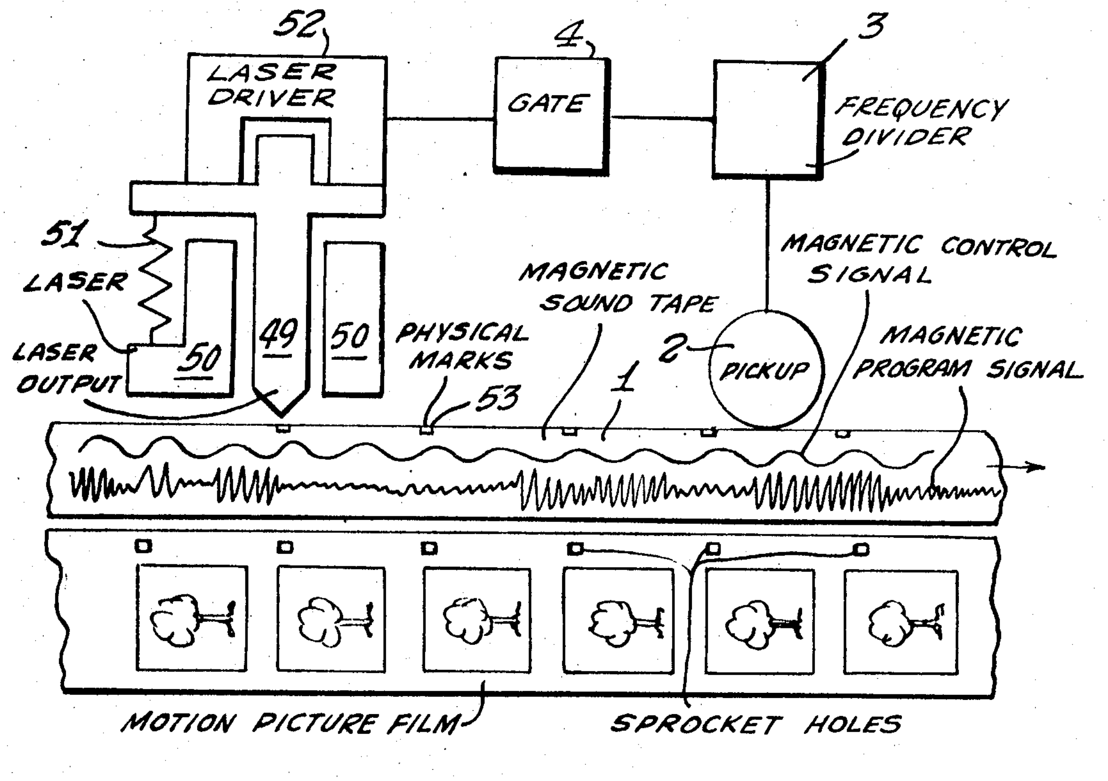

FIG. 9 is a diagrammatic view showing another preferred embodiment of the invention in which markings are applied to the carrier by the action of a laser beam.

In general terms, the operation of the invention is as follows. Before, during, or after the time the program material is recorded on an elongated record carrier, a special signal, which is separate and separable from the program material, is also recorded. Said signal may or may not be recorded by the same recording process by which the main program material is recorded. The precise form of this signal is not specified, but it must have some known property or properties suitable for the particular purpose or purposes for which the record is to be used. For example, it might be a periodic signal, with the period as the known property. This special signal will hereinafter usually be referred to as the "editing signal" or "editing track."

In certain applications, a suitable special separate and separable signal may already be recorded on the record medium for other purposes, such as for the control of synchronous motion picture apparatus, as discussed previously. In such cases it may be possible to utilize such a signal for the purposes to be described herein, in addition to utilizing it for other purposes. Or, such a special signal may be present accidentally on the recording medium, an example being the hum recorded on most magnetic tape recorders 40 or 50 db. below program level. Such signals may also be recoverable for the purposes described herein.

In one preferred embodiment of the invention, while or after such an "editing track" is recorded, it is reproduced by conventional means, whereupon, acting in cooperation with apparatus to be described below, it triggers an electric spark between electrodes located in the vicinity of the elongated record carrier. This electric spark leaves precisely located marks or indicia on the elongated record carrier which may be aligned during subsequent editing.

In another preferred embodiment of the invention, while or after such an editing track is recorded, it is reproduced by conventional means, whereupon, acting in cooperation with apparatus to be described below, it triggers a beam of electromagnetic radiation, such as a laser beam, which acts upon the carrier to leave precisely located marks or indicia which may be aligned during subsequent editing of the carrier.

In a preferred form of the invention for motion picture work, the control track, recorded to control the speed of synchronous playback or re-recording equipment, as discussed previously, is also utilized as the special editing track alluded to above. The signal in this case may be a sample of the powerline voltage; the known property of the signal which is made use of in this case is its period, since the powerline frequency is closely controlled.

However, it should be noted that reference to the known properties of this special signal do not necessarily refer to absolute properties, but may refer to relative properties as well. Thus, when it is stated that the period of the recording of the powerline voltage is a known property, it does not necessarily imply that the absolute period in terms of astronomical time is known, but it implies that the operation of equipment controlled by the control and/or editing track bears some fixed and predictable relationship to the properties of the signal recorded thereon.

Continuing the description of a preferred form of the invention for motion picture work, the control (and in this case, editing) track is reproduced immediately after it is recorded, or at any subsequent time, and is caused to operate a frequency converting device such as a frequency multiplier, a frequency divider, or a combination thereof, so that one output pulse is obtained whenever a certain predetermined number of cycles, or fraction thereof, on the special control and/or editing track passes the reproducing head. (The terms "frequency converting device" or "frequency multiplier and/or divider" as used in this application also encompass the special case of one-to-one frequency conversion, i.e., no conversion at all. In this special case, an actual converting device having a one-to-one conversion may be used, or the device may be omitted entirely.) These output pulses are then used to control a marking apparatus which, by means of the action of an electric spark, or by the action of a beam of electromagnetic radiation, places visible (and in some cases, tactile) marks or indicia on the elongated record carrier, which have a precise phase relationship to the signal on the editing track. Typical generalized physical relationships between the physical marks, the recorded control and program signals and the motion picture film are depicted in FIG. 9.

The space between these markings then corresponds precisely to a certain integral or fractional number of frames of concomitant motion picture film. For example, if the powerline frequency is 60 Hz. and a frequency division of 10 is used, then six output pulses (and hence six markings) are obtained for every 60 cycles of powerline voltage. But, since (as is usually the case) 24 frames of film were also recorded on the picture record while 60 cycles of powerline voltage elapsed, the distance between each pair of markings on the elongated sound record carrier corresponds to four frames of film. A frequency division of five would produce intervals between markings corresponding to two frames of film. A frequency multiplication of 2 followed by a frequency division by 5 would produce intervals between markings corresponding to one frame of film. The space between the markings may thus be adjusted according to requirements to correspond to any integral or fractional number of frames of film.

Of course, this system will work equally well if a film speed of other than the usual 24 frames per second is used on the picture record. For example, in current amateur practice a standard speed of 18 frames per second is used.

The editing track may also be reproduced at a speed other than that at which it was recorded, in order to save time, or for other reasons.

It is now a simple matter for the film editor to count off a length of sprocketless elongated sound record which will correspond exactly to the concomitant picture. It is by no means necessary to count each mark individually, but large blocks of marks may be counted off together by comparing with a ruler or other suitable scale. Since the approximate distance between marks is known, the number in a large but known length of record carrier is also known. It is only necessary for the possible errors due to carrier stretch and shrinkage to be small enough over the unit length being measured so that an error of as much as one mark cannot be made.

Most record carriers are made of material which makes it possible to feel the markings or indicia on the carrier as the carrier is passed through the fingers. This makes it possible to count the markings at a rapid rate as the carrier is wound from one reel to another.

Instead of comparing with a scale, it is also possible to use the editing track to place a plurality of sets of marks on the elongated record carrier, displaced laterally or longitudinally from each other or otherwise distinguishable from each other, certain sets of said marks being further apart from each other longitudinally for rapid determination of longer lengths of record carrier, while other certain sets are closer to each other for precise determination of shorter lengths of carrier.

It is also possible to record a plurality of separate and separable editing tracks, each of which controls a particular set of marks, certain sets corresponding to longer lengths of carrier, and certain sets corresponding to shorter lengths of carrier.

Turning now to the method and apparatus used to actually place the markings or indicia on the carrier, the applicant has found the following method and apparatus to be one preferred embodiment of the invention for precision marking of a flexible elongated record carrier, such as magnetic tape, which is to be edited, for example, with a concomitant picture record.

The pulses obtained from the editing track, which in this case may be a recording of the powerline voltage, after appropriate frequency multiplication and/or division, as discussed previously, are caused to trigger an electric spark between electrodes arranged relative to the path of travel of the elongated carrier in such a manner that the spark leaves a permanent visible marking on said carrier, said marks being repeated at certain intervals along the length of said carrier, according to the information contained on the editing track.

The marks may be placed at any point across the lateral dimension of the tape, at the edge or edges, or at the center, or at any intermediate point. The marks may be of any longitudinal extent desired, for example one-eighth of an inch, and their spacing may also be anything desired. The extent and/or spacing may even be variable from one portion of the carrier to another, such variable extent and/or spacing being effected by manual or automatic control of the frequency dividing and/or multiplying apparatus, or of the editing track itself.

The electric spark has the advantage of eliminating the inertia of moving parts, thus maintaining the necessary precise phase relationship between the markings on the carrier and the control signal, as discussed earlier.

The exact method used to trigger and produce said spark is not prescribed, since many methods of doing this are known to the art. However, as an example, one of the methods which has been found quite satisfactory will be described.

Figure 1:
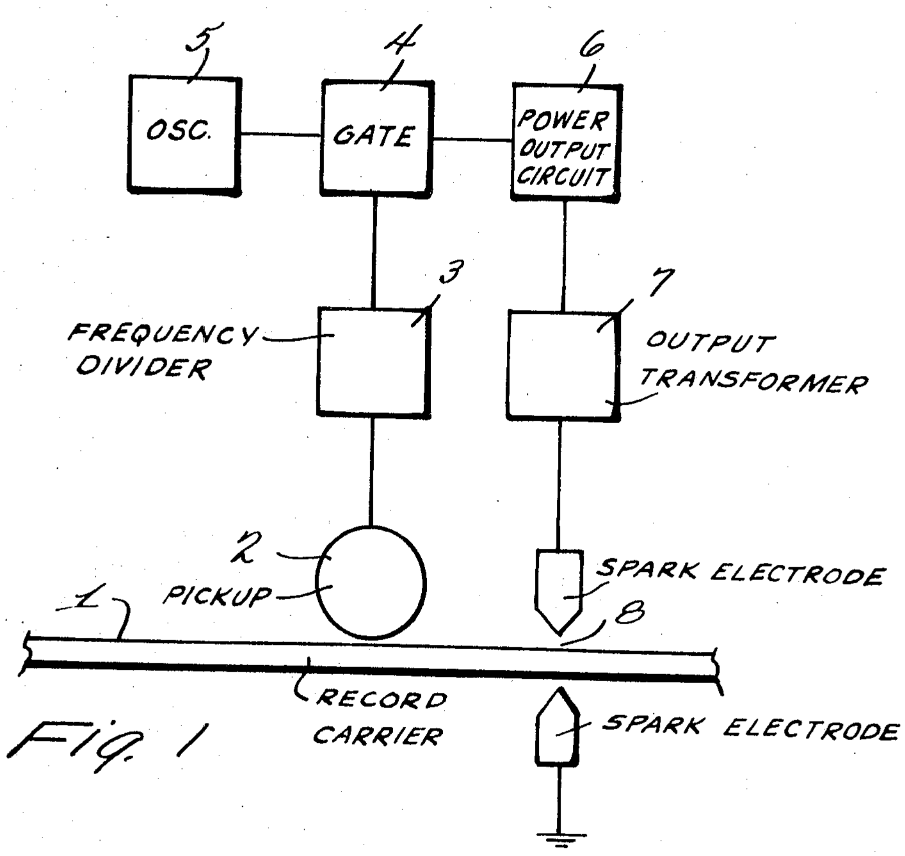
FIG. 1 is a diagrammatic view showing a preferred embodiment of the invention in which markings are applied to the carrier by the action of an electric spark.

Referring to FIG. 1, the record carrier 1, containing the special editing track, is brought into contact with the pickup head 2, which reads the signal off the special editing track and feeds it to the frequency multiplier and/or divider 3. The output of the frequency multiplier and/or divider 3 is then fed to the gate circuit 4 which is connected between the oscillator 5 and the power output circuit 6. The output pulses from the frequency multiplier and/or divider 3 activate the gate circuit 4 and allow the oscillator output voltage to be fed to the power output circuit 6 and thence to the output transformer 7 and the spark gap 8. Thus, every pulse from the frequency multiplier and/or divider causes a spark to occur across the gap 8, said spark placing a mark on said carrier 1, as previously described.

Several arrangements which have been found particularly satisfactory for marking elongated record carriers by means of a spark will be described in detail.

It has been mentioned that for a film speed of 24 frames per second, and an editing track having a frequency of 60 Hz., a frequency division of 10 produces markings on the carrier having a spacing which corresponds to four frames of motion picture film; a frequency division of 5 produces markings having a spacing which corresponds to two frames of motion picture film; a frequency division of 5 plus a frequency multiplication of two produces markings having a spacing which corresponds to one frame of motion picture film. Thus, it can be seen that it is desirable to provide circuitry which divides by 10 and by 5, and multiplies by 2. (Strictly speaking, the division by 5 is superfluous, since this can also be achieved by dividing by ten and multiplying by 2. However, providing direct division by five has been found to simplify the circuitry somewhat.)

Circuitry which divides by 10 is easily achieved by making use of the so-called "cold cathode glow transfer tube" which has the required 10 cathodes symmetrically disposed about an axially positioned anode. Initially the glow discharge occurs between the anode and one of the 10 cathodes; each pulse fed to the tube causes the glow to transfer to the next cathode. Application of a periodic series of pulses, such as obtained from a periodic editing track after suitable shaping, causes the glow to transfer continuously from one cathode to the next, and the glow discharge appears to rotate continuously inside the tube. If one of the cathodes is connected to ground through a resistor, a voltage will be developed across this resistor each time the glow transfers to that particular cathode. An output circuit connected across this resistor will therefore be fed one pulse for every 10 pulses fed to the tube, thus achieving the desired result, i.e., frequency division by 10.

Connecting two diametrically opposed cathodes together and grounding them through a common load resistor results in twice as many output pulses, that is, one output pulse for every five input pulses, resulting in frequency division by 5.

A standard reset circuit used with these tubes may be employed to start the discharge on one particular cathode at the beginning of each scene, so that the first output pulse occurs after the same number of input pulses each time. The first mark on the carrier will then occur at the same point relative to the beginning of each scene. It may sometimes be desirable to run the tape in reverse, so that the first mark occurs at the same point relative to the end of each scene, rather than the beginning.

Figure 2:
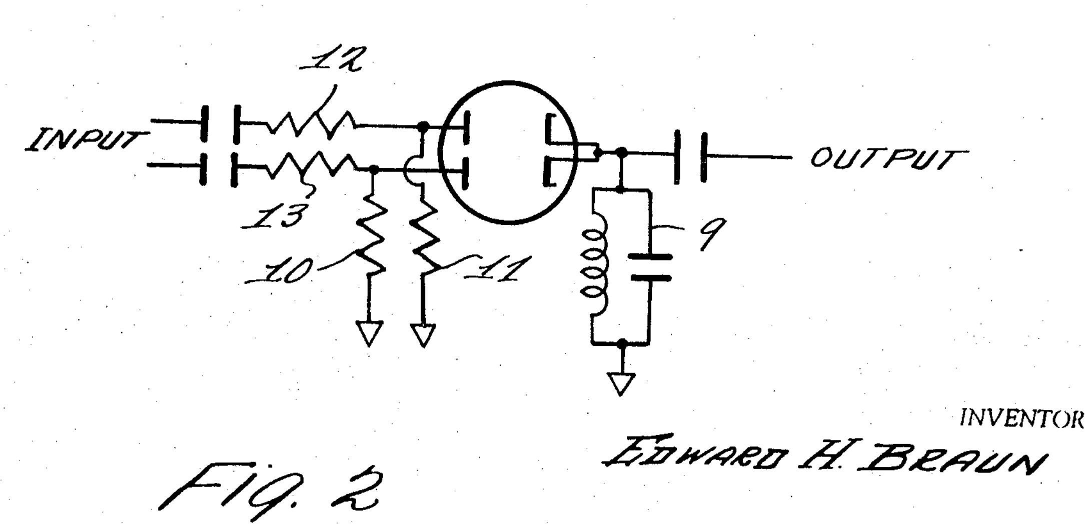
FIG. 2 is a circuit diagram of a frequency doubling circuit which may be used in the invention.

Turning now to the frequency doubling circuit which may be required, reference is made to FIG. 2 which illustrates a dual-diode-type tube. After suitable amplification, and filtering with respect to frequency if necessary, the signal from the editing track is fed to one plate of the dual diode. The same signal is fed to the other plate, except that its phase is first inverted, so that the signals on the two plates are 180° out of phase. Current flows through the tube in response to the applied voltage, and this current has the approximate form of a sine wave with the negative half-cycles inverted. As is well known, the Fourier expansion of a fully rectified sine wave contains a direct current component, a second harmonic component, and higher order harmonics. The tuned circuit 9 is resonated at a frequency of 120 cycles per second (assuming the frequency of the signal on the editing track is 60 Hz.), and therefore presents a high impedance to the second harmonic component of plate current, and a low impedance to the direct component and higher harmonics. Hence, the principal component of the output voltage is at double the input frequency. This output, after suitable shaping, may be fed to a glow transfer counting tube which is operated as a 5-to-1 frequency divider, as described previously, and thus the required multiplication and division has been achieved to produce markings, the spacing between which corresponds to one frame of motion picture film.

The DC component of plate current passes through resistors 10 and 11, and resistors 12 and 13 serve to adjust the output level to equalize the output of the doubler with the signal which is fed directly to the frequency dividing circuit when the doubler is not in use. Since this frequency doubler introduces a slight loss into the circuit, it must be followed by an amplifier to bring the signal level back to its original value.

Of course, for other film speeds and other spacings of the markings, other counting ratios will be required. These ratios may be achieved in a similar way, with glow transfer tubes having a different number of cathodes, for example, or else it may be more convenient to use entirely different counting circuits.

Now that the required frequency multiplication and division has been achieved, and one output pulse has been produced for a certain number of input pulses, it is necessary to provide means which may be actuated by the output pulses to actually mark the carrier.

In the case of the marking system utilizing the action of an electric spark, which was illustrated in FIG. 1, these pulses are used to activate a gate circuit which then allows the oscillator 5 to feed its output voltage to the power output tube 6 and thence to the output transformer 7 and spark gap 8.

Figure 3:
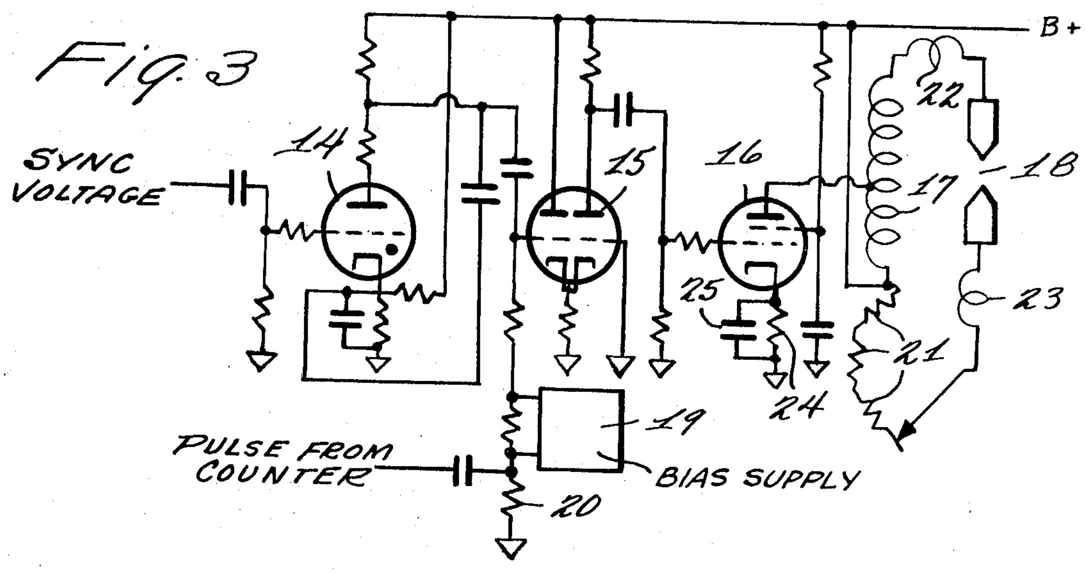
FIG. 3 is a circuit for producing and triggering an electric spark.

A typical circuit is shown in FIG. 3; it consists of a sawtooth oscillator 14 which is illustrated as a thyratron, although it may be any type of oscillator capable of producing the desired waveform, a buffer amplifier 15 which is also used as a gate circuit, a power amplifier 16, an output transformer 17, and a spark gap 18. The circuit operates as follows:

With no pulse coming from the counting circuits, the first triode section of the buffer amplifier 15 is biased far beyond cutoff by the bias supply 19. Hence, the sawtooth output voltage from the oscillator 14 has no effect on the plate current of the buffer amplifier 15 and hence no output voltage is developed in its plate circuit.

When a positive pulse is produced in the output of a counting circuit, this voltage is developed across the resistor 20 and neutralizes the negative bias produced by the bias supply 19. Thus, for the duration of the pulse the grid of the first triode section of the buffer amplifier 15 is at DC ground potential, and the tube operates normally as an amplifier. The sawtooth output voltage from the oscillator is then amplified and fed to the power amplifier 16. During the operation of the sawtooth cycle when the voltage is rising linearly, the plate current of the power amplifier 16, flowing through the output transformer 17, builds up to some maximum value. It is then suddenly interrupted by the flyback portion of the sawtooth cycle, and this rapidly changing current induces a large voltage across the output transformer 17 and causes a spark to occur across the gap 18. The transformer 17 may be of the flyback type used in television receivers, and may be either an autotransformer, or it may have isolated primary and secondary windings. A voltage rating of 15 to 20 kv. (unloaded) has been found to produce good results for tape speeds of 3.75 to 15 inches per second.

In case the transformer is an autotransformer, as shown in the illustrations, one side of the spark gap should be connected to the "hot" side of the high-voltage winding, and the other side to the point on the winding which is connected to the positive side of the B supply. Connecting the latter side of the spark gap to ground would result in a heavy continuous DC arc being triggered which would damage the electrodes and which would not follow the pulses from the counting circuit faithfully. Connecting both electrodes to the transformer winding places them both at the same DC potential and eliminates the danger of arcing.

When the transformer is constructed with primary and second windings isolated from each other, then one side of the secondary may be grounded along with one of the electrodes in the spark gap, with no danger or arcing, since no DC is present in the secondary circuit.

The frequency of the sawtooth wave may be in the range of approximately 8 to 10 kHz., for example, and should be stabilized at whatever design frequency is decided upon. This insures that the proper plate voltage is present on the power output tube 16 during the linear rise portion of the sawtooth cycle, thus making for greater efficiency. This stabilization may be achieved by making use of an auxiliary oscillator having high frequency stability, such as a Wien Bridge Oscillator, and feeding its output to the grid of the sawtooth oscillator. This locks the sawtooth oscillator exactly in step with the auxiliary oscillator and provides the necessary stability of the sawtooth wave.

It is necessary to control the intensity of the spark occuring across the gap to compensate for different types of record carrier, and for different linear speeds thereof. This may be accomplished by placing resistors 21 in series with the "cold" side of the secondary winding. These may all be wired in series and connected to a multiple position make-before-break switch. As the switch is rotated, more and more resistance is thrown in series with the winding, and the spark decreases in intensity. The make-before-break feature prevents arcing across the switch contacts during switching. Although for simplicity the illustration shows three resistors connected in series, preferably a larger number would be used to give finer increments in the spark intensity control. Or, of course, a continuously variable rheostat may be used in place of the switch and resistors.

It may be found that the occurrence of the spark causes interference with other circuits. This is due chiefly to high-frequency energy set up by the spark which is radiated from the connecting wires. This interference may be eliminated by the use of suitable filters, which are best installed as close to the spark gap as possible. The filters may consist, for example, of two inductances 22, 23, one placed in each lead to the spark gap. These present a high impedance to the high-frequency currents, while the capacity across the gap and connecting wires offers a low impedance, thus effectively short circuiting these currents and preventing them from flowing in wiring having sufficient length to cause appreciable radiation. The inductances used may be of the small air core type consisting of three or four pie sections in series, and having an inductance of about 1 millihenry, for example.

In the circuit of FIG. 3, the grid drive to the power amplifier 16 is switched on and off by the action of the gate tube 15. Since removing the signal from the grid of the power amplifier would ordinarily reduce the grid bias to zero, it is necessary to provide protective bias during the "no drive" periods to prevent the plate current from rising to excessive values and destroying the tube. This protective bias may be produced by use of a cathode resistor 24 and cathode bypass capacitor 25.

The use of a cathode resistor has the disadvantage, however, that it holds the cathode of the tube at a DC potential above ground, and so reduces the effective plate voltage on the tube. This may, of course, be offset by increasing the B supply voltage. In addition, the flow of plate current during those periods when the tube is not actually in use shortens tube life.

Figure 4:
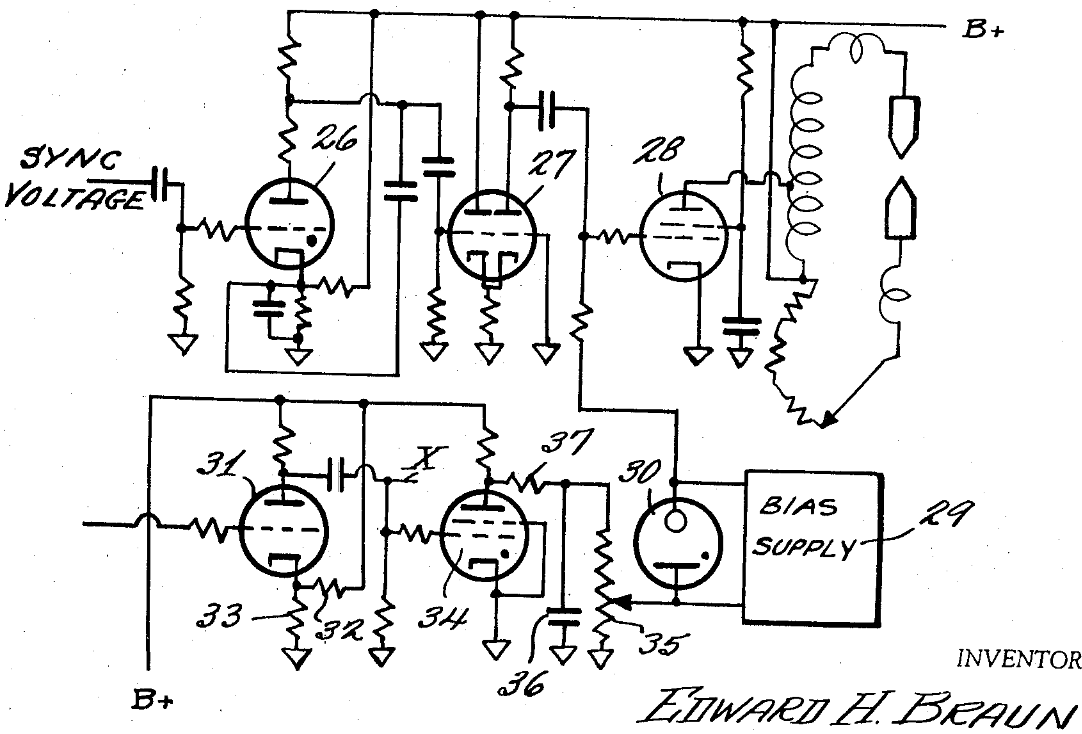
FIG. 4 is an alternative circuit for producing and triggering an electric spark.

These disadvantages may be overcome by the circuit of FIG. 4. In this circuit the buffer amplifier 27 is not used as a gate, but is in operation continuously, amplifying the sawtooth wave from the oscillator 26 and feeding it to the grid of the power amplifier 28. However, the grid of the power amplifier 28 is normally biased far below cutoff by the bias supply 29 which may employ a gaseous voltage regulator tube 30.

A positive pulse from the counting circuit is amplified by the pulse amplifier 31, which is normally biased to cutoff by the combination of resistors 32 and 33. The amplified pulse, which is now negative due to the phase inverting action of the pulse amplifier 31, is fed to the grid of a thyratron 34 which is unbiased and therefore normally conducting. The negative pulse from the pulse amplifier cuts off the thyratron 34, causing its plate voltage to rise from the normally very low value while conducting (about 8 to 16 volts) to the B supply voltage. This voltage is developed across the potentiometer 35, and the positive side of the bias supply 29 is raised above ground to a potential which depends on the potentiometer setting. Since the DC potential of the grid of the power output tube 28 with respect to ground (and hence with respect to its cathode) is the sum of the voltage between the potentiometer arm and ground, plus the bias voltage, proper adjustment of the potentiometer will produce the correct DC operating bias voltage on the grid during the duration of the pulse. The sawtooth voltage being fed to the grid will then cause a spark to occur across the gap during this "pulse on" period, as previously described. Upon removal of the pulse, the thyratron 34 again fires, the grid of the power output tube 28 again falls below cutoff, and the spark ceases.

In order to insure reliable cutting off of the thyratron when a negative pulse is applied to its grid, it is necessary to hold the plate potential of the tube at the low value it has while firing until deionization can occur. This is achieved by shunting the tube by a small capacitor 36. This capacitor also acts to hold the plate potential at the high value it has during cutoff to facilitate firing when the negative pulse is removed and the grid voltage returns to zero. The small resistor 37 in series with the capacitor 36 limits the discharge current through the thyratron to a safe value.

Otherwise the operation of the circuit of FIG. 4 is identical to that of FIG. 3.

Since the current through the power output tube is of a pulsating nature, usually at a fairly low frequency, there is a considerable fluctuation in the B supply voltage between the "-pulse on" and "pulse off" condition. This effect is worsened by the fact that a sharply rising wave front on the pulse is desirable, and any abrupt change in current causes a drop across the filter inductances and transformers in the power supply. This fluctuation in the B supply voltage may be eliminated by using an auxiliary power amplifier as a ballast tube which conducts while the power amplifier is off, and is cut off when the power amplifier is conducting. The grid of this tube may be controlled, for example, by connecting it to the point marked "X" in FIG. 4, since this point has a polarity opposite to that of the pulse fed to the grid of the power amplifier. The load and bias on the auxiliary tube are adjusted so that its plate current while conducting is equal to the average plate current of the power amplifier while nonconducting. This arrangement produces a constant load on the B supply, and the B supply voltage does not fluctuate between "pulse on" and "pulse off" conditions.

In FIGS. 3 and 4, decoupling networks in the B supply leads have been omitted from the diagrams for the sake of simplicity; these may be of the conventional type.

Turning now to the construction of the spark gap, reference is made to FIG. 5 which illustrates a preferred electrode assembly which may be mounted on the mechanism which drives the elongated record carrier. The assembly is symmetric about the center line; for simplicity in interpreting the drawing only the upper half has been drawn in detail and the parts numbered.

The electrodes 38, which may be made of tungsten, are press fit into a cylinder 39, which may be made of stainless steel. This cylinder is press fit into a second cylinder 40, which in turn is imbedded in a block of plastic having a high melting point and good electrical insulating properties, such as teflon. The cylindrical cap 41, which may be made of nylon, may be removed and the stainless steel cylinder 39 may be adjusted vertically to position the electrodes. Once the electrodes have been set, they need not be adjusted further, and the cap 41 may be replaced permanently. If desired, the cylinders 39 and 10 may be furnished with external threads to facilitate the adjustments. Connection to the electrodes is made through the contacts 42 by means of a plug, such as that illustrated in FIG. 6.

This plug may be constructed by fitting a pair of spring contacts 43, which may be made from beryllium copper, into a pair of teflon cylinders 44. Coils 45 for the interference filter are soldered to the contactors 43 at one end, and to lead wires at the other end which should be insulated for high voltage and twisted around each other to minimize radiation These assemblies are placed inside of a hollow plastic block 46 which may also be made of teflon. After adjusting the spacing of the conductors 43 to match the contacts 42 of the assembly illustrated in FIG. 5, the plastic block 46 is filled with molten plastic 47, which is then allowed to harden. This completes the plug assembly. (FIGS. 5 and 6 are not drawn to the same scale; the actual dimensions would be such that the spacing and size of the contacts would enable both units to fit together.)

To place the device in operation, the carrier is placed in the slot 48, FIG. 5*b*, and set into motion. The plug is attached to the electrode assembly, the high voltage is turned on, and the spark begins firing and marking the carrier.

For ¼-inch magnetic tape, a preferred method of marking locates the tape so that a line joining the points on the electrodes passes through the tape at a point about midway between the center and the edge, that is to say, a point about one-sixteenth inch from the edge of the tape. The spark will then jump around the edge of the tape and leave a visible marking thereon.

When placing markings at the edge of magnetic tape in this manner, it may be desirable, on reproducing the track adjacent to the markings, to displace the pickup head laterally from its normal position so that it will not read that portion of the tape bearing the markings. It may also be desirable to construct the pickup head so that it has a slightly narrower width than the standard head; this again prevents the head from reading that portion of the tape bearing the markings.

In case the edge of the tape bearing the markings is adjacent to a track bearing only a single frequency (for example, 60 Hz.) control signal, a bandpass filter will eliminate any response to the markings.

However, the markings may usually be made with such an intensity that they are strong enough to be easily visible, but still weak enough to cause practically no interference on playback. Normally, therefore, no special precautions need be taken to eliminate the negligible response to the markings themselves.

It may also be desirable to modify the plug arrangement shown in FIG. 6 by continuing the sides of the plastic block 46 so that they pass around the outside of the electrode assembly shown in FIG. 5 when the two units are plugged together. This serves to prevent the operator from accidentally touching the contacts 42 while the units are being put together or taken apart. This would be an added safety precaution, since it is normally desirable to remove all voltages from the contacts 42 by cutting off the B supply voltage while the units are being plugged or unplugged.

The apparatus and methods just described represent only one method of accomplishing the desired result; there are numerous other methods for producing electric sparks and numerous other ways in which the action of the spark may be used to mark a record carrier in accordance with the invention.

In a second preferred embodiment of the invention, the pulses obtained from the editing track, after appropriate frequency multiplication and/or division, as discussed previously, are used to control an intense beam of electromagnetic radiation which is located relative to the path of travel of the elongated record carrier in such a manner that it leaves visible (and in some cases, tactile) markings or indicia on the carrier, these markings or indicia being repeated at certain intervals along the length of the carrier according to the information contained on the editing track. The intense beam of radiation might be produced, for example, by a laser, but could also be produced by other means.

As before, the markings may be placed at any point across the lateral dimension of the carrier, at the edge or edges, or at the center, or at any intermediate point. They may be of any longitudinal extent desired, and the extent and/or spacing may even be variable from one portion of the carrier to another.

It is also possible to control several beams simultaneously to place a plurality of sets of indicia on the carrier, having different longitudinal extents or otherwise distinguishable from each other, the different sets of indicia having spacings corresponding to different numbers of frames of film.

As in the case of the embodiment using the electric spark, the beam of electromagnetic radiation also eliminates the inertia of moving parts, thus maintaining the necessary precise phase relationship between the markings on the carrier and the control signal, as discussed earlier.

A preferred embodiment which makes use of a beam of electromagnetic radiation to place the indicia on the carrier may be illustrated by reference to FIG. 9. The record carrier 1, containing the special editing track, is brought into contact with the pickup head 2 which reads the signal off the special editing track and feeds it to the frequency multiplier and/or divider 3. The output of the frequency multiplier and/or divider 3 is then fed to the gate 49 which pulses a laser 50. The laser 50 is designed and oriented so that its beam of radiation is thrown onto the carrier. Each time the laser is switched on, a precisely located marking is placed on the carrier. As before, these markings or indicia may be visible and/or tactile, depending on the material of which the carrier is made and the intensity of the beam of radiation.

Since the theory and practice of pulsed lasers is now well known, and since such lasers are available commercially, details of their construction are omitted here.

Other sources which produce beams of electromagnetic radiation may also be used, and the radiation may lie in any region of the electromagnetic spectrum. For example, it might lie in the X-ray region, the ultraviolet, the infrared, the microwave region, etc. The quality of the markings placed on the record carrier, depending on the material of which it is made, may be improved by the use of radiation lying in one of these frequency ranges rather than another. This must, of course, be determined by experiment.

Once markings have been placed on the record carrier, they correspond, as far as editing is concerned, to the sprocket holes on the perforated type of film. The record carrier may then always be cut on the markings, or in some fixed relation thereto.

To facilitate the cutting and editing of the carrier, and the splicing of separate strips of the carrier into a contiguous whole in such a manner that the markings are properly aligned, the following modification of ordinary splicing and editing devices is desirable, for which modification reference is made to FIGS. 7 and 8. In FIG. 7, two pieces of carrier are shown mounted in an editing or splicing device, the pieces of carrier being placed one on top of the other, the piece on top being presumed to extend an indefinite amount to the right, and the piece on the bottom an indefinite amount to the left. (In the figure, for purposes of clarity, the two strips of carrier are shown displaced laterally; in actual practice they would lie one directly on top of the other.) The editing or splicing device is modified by placing thereon of affixing thereto in close proximity to the record carrier being edited, a marker or markers with which the special editing marks on the carrier may be aligned to facilitate the cutting of the carrier in a fixed relationship to the marks on the carrier. This marker on the editing or splicing device is shown in FIG. 7 as being directly below the carrier and having approximately the same longitudinal extent as the marks on the carrier. However, many other types of markers and positionings thereof are obviously possible which will insure lining up the carrier so that it is always cut in the same position relative to the marks on the carrier.

In FIG. 8 the carrier is shown after it has been cut and the unwanted excess thereof removed. Actually the two pieces are shown slightly separated for purposes of clarity in the diagram. In practice they would preferably be butted directly against one another. At this point they may be fastened together by any of the standard methods known to the art.

It can be seen that in the case where the record carrier contains a periodic editing and/or control track, such as in the synchronous motion picture work discussed previously, the marking and splicing procedure just described will result in the periodic editing and/or control track being completely continuous as to phase across the splice. Thus, the pickup head and other equipment cooperating in reading the editing and/or control track will not "see" the splice. In addition, each length of carrier will contain the proper number of cycles of control signal to maintain perfect synchronism with the concomitant picture record, irrespective of the number of separate lengths of record carrier which have been spliced into a continuous whole.

This process of lining up the markings, and editing the carrier, may be done with surprising speed and accuracy with very little effort or experience on the part of the operator.

Although many of the examples cited herein have referred to recordings on magnetic tape, and to sound records, it is obvious that the process of recording an editing track on a record carrier and using said track to control the placement of marks on the record carrier in accordance with the methods herein discussed, may be used with any type of elongated flexible record carrier containing sound or picture records, or coded signals, or other type of record, irrespective of the process or processes by which the record and/or editing signal have been impressed on the carrier. Thus, the recording may be done magnetically, electrostatically, photographically, or it may be scratched, etched, engraved, etc.

For some purposes it may be desirable to place the editing track on the carrier before the main sound or other record is recorded thereon. It may also be desirable to use said editing track to control the marking of the carrier before the main sound or other record is placed thereon.

Subsequent to the placing of the marks on the carrier, it may be desirable to erase or otherwise eliminate the editing track before placing the main sound or other record on the carrier. An example of this would be in the case of radio or television broadcasting, where it is desired to make up a program on magnetic tape, various portions of which and/or the totality of which must run for certain precise time intervals. Thus, it may be desired to have five minutes of music followed by 1 minute of sound effects followed by 5 minutes of dialogue, etc. Lengths of marked carrier which will run for the desired time may be easily determined from the markings on the carrier.

In the above examples or in other cases, it may be desirable or convenient to leave the editing track intact while or after the main program material is recorded. An example of this might be where the editing track is also used as a control track, and it is desirable to use the control track to control the speed of the carrier on playback. Such a control system, suitable for use with magnetic tape, for precisely controlling the playback speed of a "slave" tape, the playback speed being governed by the control track of a second "master" tape, or by the powerline frequency, is disclosed, for example, in U.S. Pat. No. 2,697,754. Thus, in the application to broadcast work just described, it may be desirable to achieve extremely precise timing of the total program, or portions thereof. In this case, the editing track would be left intact after the main program material is recorded in order that it may serve as a control track. Or, if such accuracy is not required, and the residual timing errors resulting from tape stretch, shrinkage, etc. fall within the allowable accuracy of timing, the editing track may still be left intact, but the carrier played back in the normal manner.

In some cases it is also possible to forego actually recording the editing track. An external editing signal may be supplied, such as the powerline voltage, the external signal being caused to operate the marking device directly; thus, the carrier may be marked either before, during, or after the time the main program material is recorded, so that it may be edited. In the case where an external editing signal is supplied, it is also possible to simultaneously record the signal (or one derived from it by suitable filtering, shaping, etc.) on the carrier at the same time the carrier is being marked. This may sometimes be more convenient and require less time than first recording the editing signal and then reproducing it to operate the marking device. The end result is, of course, the same, in that the phase of the signal recorded on the carrier and the indicia appearing on the carrier bear a definite phase relationship to one another.

Another very important use of the invention in motion picture work is in the making up of one or more auxiliary sound records containing, for example, dialogue, music, narration, sound effects, etc., to be used in dubbing to a master sound track, together with whatever sounds may have been recorded simultaneously with the taking of the concomitant picture.

Up to the present time it has been necessary (initially or eventually) to record each of these separate records on sprocket film for editing. This is precisely the problem previously encountered with the sound record which was recorded simultaneously with the picture. However, here the problem of cost of recording stock is multiplied considerably. There are frequently three, four, or more separate sound tracks which must be made up and edited to synchronize with the picture record. This becomes a very expensive proposition on sprocket film, and, if the recording is done by optical methods, there is a considerable loss in the quality of the sound. The loss in quality is amplified in this case, since these optical tracks are re-recorded optically when the master track is made and a double loss in quality occurs.

The present invention makes it possible to record and edit all these separate tracks on inexpensive high-fidelity sprocketless tape. An editing and control track or tracks is recorded on each tape before, while, or after the program material is placed thereon. The editing and control track or tracks may consist of a single combination track, or of separate tracks, and may comprise, for example, a sample of the powerline voltage, although it is also possible to record separate and different signals for each track. The tapes are then marked and edited as previously described. They are then played back as "slave tapes" with their speeds (and starting times, for critical work) controlled by cooperation of their respective control tracks and any of the synchronous playback equipment known to the art, an example of which has been given previously. They may all be mixed together and recorded on another sprocketless tape, the "master" tape, together with a master control track, or they may be re-recorded on magnetic or optical sprocket film. In case this re-recording must be done optically, a minimum loss of quality is suffered using this system, since all tracks are only recorded optically once.

Another method of producing a master sound track, which avoids use of extra synchronous playback equipment, is to record each of these separate tapes individually on the same piece of magnetic sprocket film, this magnetic sprocket film being equipped to accommodate the appropriate plurality of tracks recorded side by side. The control track on each separate tape is used to control the speed of the synchronous motor on the multiple channel film recorder, and each is recorded separately. After all the tapes have been recorded, a recording on multichannel magnetic film is obtained wherein all the tracks are properly synchronized with each other. This magnetic sprocket film may then be played back, and all the tracks re-recorded onto a single master track (on tape or film) with perfect synchronism assured. This method has the advantage that the multichannel magnetic sprocket film need never be cut, but may be erased and reused indefinitely. Again, the only expense is the almost negligible cost of the sprocketless tape used in initially recording and editing the separate records.

Instead of the multichannel film recorder, it is also possible to use a plurality of single track magnetic film recorders. As before, the sprocket film used therein may be erased and reused indefinitely.

Another important use of the invention is in the precision time control of electrical or other apparatus by means of control signals placed on elongated record carriers.

For example, it may be desired to switch a certain piece of apparatus on at a certain time, and after it has been on for 10 minutes to switch on a second piece of apparatus. Then, after the two have been running together for 1 minute, it may be desired to switch the first piece of apparatus off, etc. The different pieces of apparatus may be controlled by recorded sine waves having different frequencies, which are then separated by appropriate filters, or they may be controlled by shaped pulses, or by a variety of other methods.

An editing track having fixed characteristics, for example, a 100-Hz. sine wave, or a recording of the powerline voltage, is recorded on a length of carrier sufficiently long to contain all the control information. The carrier is then marked by cooperation of the recorded editing track and the marking means discussed previously. Appropriate control signals are recorded before, during, or after the time the editing track is recorded, the length of carrier devoted to each signal being slightly longer than what is actually required. The carrier is then cut so that precisely the correct length of each control signal is present, and all the sections are spliced together.

The control signals on the carrier are now reproduced by standard means, perhaps with the speed of said carrier controlled, by using the carrier as a slave tape, as discussed previously. Or, if the possible timing errors due to tape stretch, slippage, etc., fall within the limits of tolerable timing error, the speed of the carrier need not be controlled, but playback may proceed in the ordinary way.

It is also possible to supply an external editing signal or signals which operate the marking device directly, thus eliminating the necessity for recording the signal or signals.

Although I have described several applications of my invention and several particular arrangements which are satisfactory for placing my invention into operation, it is obvious that numerous variations are possible in these applications and arrangements which do not, however, depart from the true spirit and scope of the invention. In addition, it should be clearly understood that solid state components, for example transistors, may be readily substituted for the tubes illustrated in the drawings, if desired.

What is claimed is:

1. A method for facilitating the precision editing of a first elongated record carrier having both an editing signal and a program signal recorded thereon with the editing signal having a predetermined relationship to the playback of other recorded information on a second record carrier having drive sprocket holes therein with which said program signal is to be synchronized, said method comprising the steps of:

generating a first electrical signal in response to said editing signal, and precisely marking said first elongated carrier with physical indicia readily sensible to a human being in response to said first electrical signal, thus correlating the first elongated record carrier with said drive sprocket holes on said second record carrier by providing a humanly sensible indication of said predetermined relationship with respect to physical lengths on said first elongated record carrier.

2. A method as in claim 1 wherein said marking step comprises creating an electrical spark discharge across at least a portion of said first elongated carrier to produce a physical mark precisely delineated and disposed upon said first carrier.

3. A method as in claim 1 wherein said marking step comprises directing an intense beam of electromagnetic radiation onto at least a portion of said first elongated carrier to thereby produce a physical mark on said first carrier in precise and substantially instantaneous correspondence with said first electrical signal.

4. A method for facilitating the precision editing of an elongated record carrier having both an editing signal and a program signal recorded thereon with the editing signal having a predetermined relationship with the editing signal having a predetermined relationship to the playback of other recorded information with which said program signal is to be synchronized, said method comprising the steps of:

generating a first electrical signal in response to said editing signal, transforming said first electrical signal according to a predetermined function to produce a second electrical signal, and precisely marking said carrier with physical indicia readily sensible to a human being in response to said second electrical signal, thus providing a humanly sensible indication of said predetermined relationship with respect to physical lengths of said record carrier, said physical indicia representing a convenient predetermined relationship to said playback of other information.

5. A method as in claim 4 wherein said other information comprises recorded frames of motion picture images and wherein the frequency of said editing signal is related to the number of said frames played back per unit time and wherein:

said transforming step includes changing the frequency of said first electrical signals to cause said electrical signals, and hence said marks, to occur in correspondence to a predetermined number of said frames.

6. Apparatus for facilitating the precision editing of a first elongated record carrier having both an editing signal and a program signal recorded thereon where the editing signal bears a predetermined relationship to the playback of other recorded information on a second record carrier having drive sprocket holes therein, with which said program signal is to be synchronized, said apparatus comprising:

means for supplying a first electrical signal in response to said editing signal, and means for precisely marking said first elongated record carrier with physical indicia readily sensible to a human being in response to said first electrical signal thus correlating the first elongated record carrier with said drive sprocket holes on said second record carrier by providing a humanly sensible indication of said predetermined relationship with respect to physical lengths on said first elongated record carrier.

7. Apparatus as in claim 6 wherein said means for precisely marking comprises electrical discharged terminals for creating an electrical spark discharge across at least a portion of said first elongated carrier.

8. Apparatus as in claim 6 wherein said means for precisely marking comprises:

means for generating and directing an intense beam of electromagnetic radiation onto at least a portion of said first elongated carrier.

9. Apparatus for facilitating the precision editing of an elongated record carrier having both an editing signal and a program signal recorded thereon where the editing signal bears a predetermined relationship to the playback of other recorded information with which said program signal is to be synchronized, said apparatus comprising:

means for supplying a first electrical signal in response to said editing signal, means for transforming said first electrical signal according to a predetermined function and for producing a second electrical signal in response thereto, and means for precisely marking said carrier with physical indicia readily sensible to a human being in response to said second electrical signal thus providing a humanly sensible indication of said predetermined relationship with respect to physical lengths of said record carrier, said physical indicia representing a convenient predetermined relationship to said playback of other information.

10. Apparatus as in claim 9 wherein said other information comprises recorded frames of motion picture images and wherein the frequency of said editing signal is related to the number of said frames played back per unit time, said means for transforming comprising:

means for changing the frequency of said first electrical signals to cause said second electrical signal and hence said physical indicia to occur in direct correspondence to a predetermined number of said frames.

11. An apparatus for marking a first elongated record carrier having a program signal recorded thereon, whereby a certain required longitudinal extent of said carrier may be obtained, said apparatus comprising:

means for supplying a suitable editing signal corresponding to an editing signal also recorded on said carrier, and means including frequency-converting means responsive to said editing signal for applying markings to said carrier by the action of an electric spark.

12. An apparatus for marking a first elongated record carrier having a program signal recorded thereon, whereby a certain required longitudinal extent of said carrier may be obtained, said apparatus comprising:

means for supplying a suitable editing signal corresponding to an editing signal also recorded on said carrier, and means including frequency-converting means responsive to said editing signal for applying markings to said carrier by the action of a beam of electromagnetic radiation.

* * * * *